United States Patent [19]

Suzuki et al.

[11] 3,875,217
[45] Apr. 1, 1975

[54] PROCESS FOR THE PURIFICATION OF TRANS-4-AMINOMETHYL-CYCLOHEXANE CARBOXYLIC ACID

[75] Inventors: Kikuji Suzuki; Hiroki Kuroda; Saburo Nabeta, all of Tokyo, Japan

[73] Assignee: Daiichi Seiyaku Co., Ltd., Tokyo, Japan

[22] Filed: Apr. 30, 1973

[21] Appl. No.: 355,874

Related U.S. Application Data

[62] Division of Ser. No. 216,200, Jan. 7, 1972.

[52] U.S. Cl. .............................................. 260/514 J
[51] Int. Cl. .......................................... C07c 101/07
[58] Field of Search ................................. 260/514 J

[56] References Cited
UNITED STATES PATENTS
3,499,925   3/1970   Naito et al. ........................ 260/514

FOREIGN PATENTS OR APPLICATIONS
1,112,897   5/1968   United Kingdom ............... 260/514

Primary Examiner—Robert Gerstl
Attorney, Agent, or Firm—Oblon, Fisher, Spivak, McClelland & Maier

[57] ABSTRACT

Purification of trans-4-aminomethyl cyclohexane carboxylic acid, which is contaminated with cis-isomer, is effected by contacting the crude crystals with cold water at a temperature of below 21.5°C., to recrystallize pure crystals containing three molecules of hydrated water per molecule of trans-4-aminomethyl-cyclohexane carboxylic acid.

1 Claim, 1 Drawing Figure

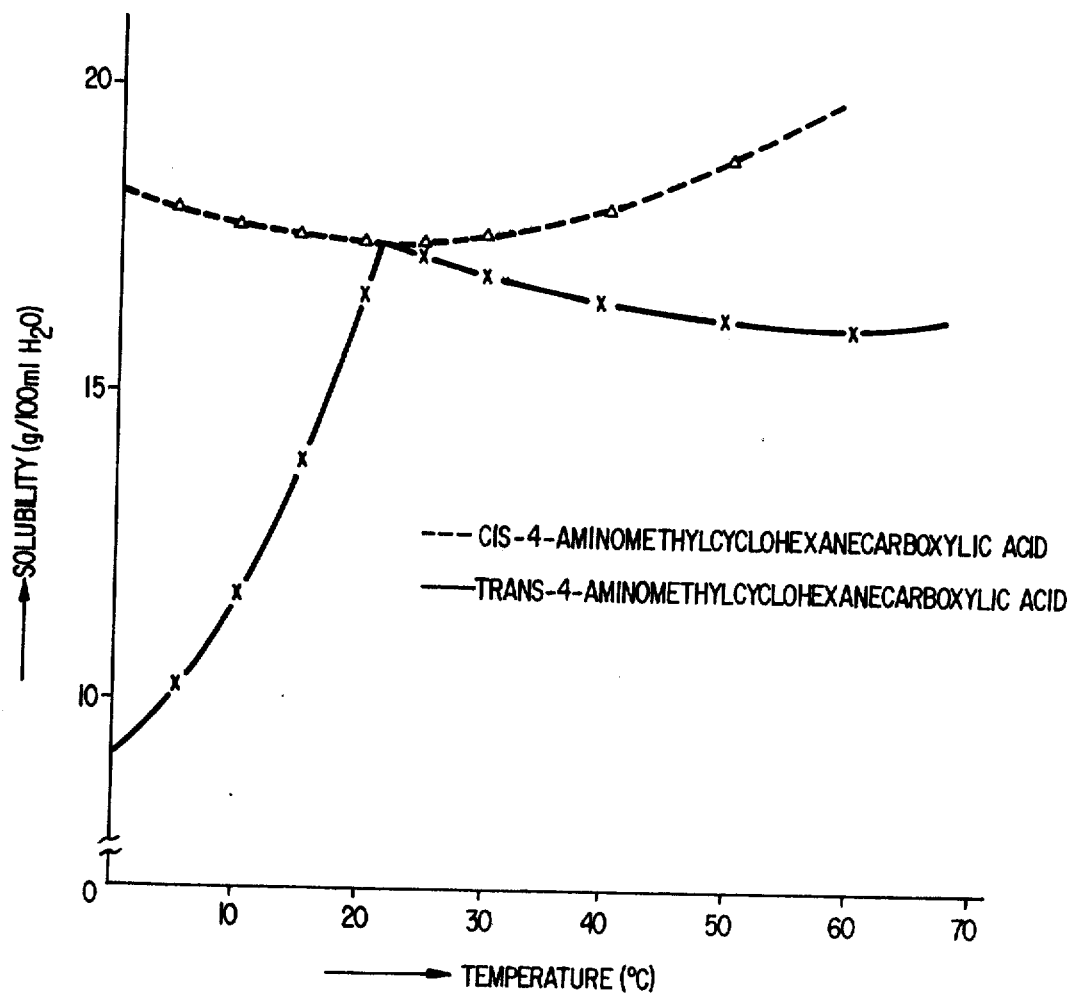

PROCESS FOR THE PURIFICATION OF TRANS-4-AMINOMETHYL-CYCLOHEXANE CARBOXYLIC ACID

BACKGROUND OF THE INVENTION

This is a division, of application Ser. No. 216,200, filed Jan. 7, 1972.

FIELD OF THE INVENTION

The present invention relates to a process for purifying trans-4-aminomethyl-cyclohexane carboxylic acid (hereinafter referred to as trans-AMCHA) which is contaminated with the corresponding cis-isomer (hereinafter referred to as cis-AMCHA). In one embodiment, the crude AMCHA is obtained by a process for synthesizing trans-AMCHA.

Trans-AMCHA has practical utility as an excellent antiplasmin drug.

DESCRIPTION OF THE PRIOR ART

Two stereoisomers of 4-aminomethyl cyclohexane carboxylic acid (AMCHA) exist due to the positioning of the —COOH and —CH$_2$NH$_2$ substituents on the cyclohexane ring as indicated below:

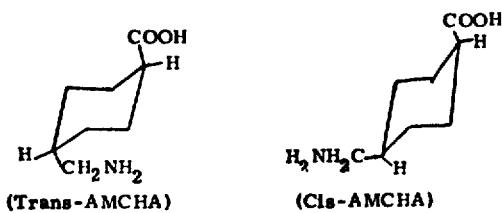

(Trans-AMCHA)     (Cis-AMCHA)

Since the cis-isomer does not possess anti-plasmin activity, it is necessary to use only the trans isomer, which has usually required a complex separation procedure. In the usual method of synthesizing AMCHA which involves a reduction of the corresponding benzene derivative to the cyclohexane derivative, a mixture of the isomers is always produced due to the presence of substituents on both the 1 and 4 positions of the ring. While it is known that the cis-isomer can be converted to the trans-isomer by isomerization in an alkaline medium, a thermodynamic equilibrium exists between the cis- and trans-isomers so that complete conversion is unattainable.

In an effort to circumvent this difficulty, it has been suggested to convert the isomers to their corresponding p-toluene sulfonate salts, since the trans-isomer salt is slightly more soluble than the cis-isomer, collect the trans-isomer salt and then to reconvert the trans-AMCHA salt to trans-AMCHA (see Japanese Pat. No. 535,876). That method, however, is not satisfactory from an industrial point of view, because it is rather complex and requires the use of an expensive reagent.

Recrystallization of AMCHA from water, alcoholates, or other organic solvents is not satisfactory to separate the cis-isomer. To show this unsuitability, the following experiments were carried out:

Crude AMCHA (cis/trans = 20/80) was dissolved in a small amount of water and concentrated in vacuo at 60° to 70°C. to effect recrystallization. The resulting crystals were collected by filtration and washed with methanol and dried. The content of cis-isomer was analyzed by gas chromatography and is shown in Table I.

TABLE I

| Exp. No. | Yield of collected crystals (%) | Content of cis-isomer in purified crystals (%) |
|---|---|---|
| 1 | 72 | 3.5 |
| 2 | 68 | 3.4 |
| 3 | 60 | 3.6 |
| 4 | 50 | 4.0 |

Repeated recrystallization as often as 3 - 5 times, still yields impure crystals contaminated with 0.5 to 1 percent cis-isomer, even if the yield of trans-AMCHA is purposely minimized.

It is believed that the poor results obtained by simple recrystallization is due to the high affinity between the cis and trans-isomers and by the tendency for the cis-isomer to be taken into the crystal lattice structure of the trans-isomer, even if the concentration of the cis-isomer is considerably lower than its saturation concentration in the solution.

SUMMARY OF THE INVENTION

Accordingly, it is one object of this invention to effect an industrially acceptable technique for the purification and separation of the cis-isomer of AMCHA from the corresponding trans-isomer.

This and other objects, as will hereinafter become apparent, have now been attained, and an especially advantageous purification of trans-AMCHA has been achieved by contacting crude AMCHA crystals containing a mixture of the trans and cis-isomers with a small amount of water which has been cooled to a temperature of below 21.5°C. The quantity of water used should be adjusted so that most of the crystals will remain undissolved.

Pure crystals of trans-AMCHA containing three molecules of hydrated water per molecule of trans-AMCHA is obtained.

BRIEF DESCRIPTION OF THE DRAWING

The Drawing shows the solubility curves of cis- and trans-AMCHA in water at various temperatures.

DETAILED DESCRIPTION OF THE PREFERRED EMBODIMENTS

In accordance with the present invention, highly pure trans-AMCHA can be easily obtained in the following manner:

Crude crystals of AMCHA are mixed with two to three times its weight of cold water and thoroughly stirred. The period of stirring is not critical and 30 minutes to 4 hours is usually satisfactory. The temperature of the water used should be below 21.5°C. During stirring, a portion of the crude crystals will be dissolved and recrystallized as pure trans-AMCHA containing three molecules of crystallized water. Dissolution and recrystallization therefore proceed simultaneously in the solution. The pure hydrated trans-AMCHA crystals are easily collected by filtration.

Hydrated crystals of trans-AMCHA, (trans—C$_8$H$_1$$_5$NO$_2$ . 3H$_2$O) are novel crystals. The presence of the three molecules of hydrated water in the crystal lattice of the trans-AMCHA seems to prevent the entrance of the cis-AMCHA molecules into the structure so that the cis-isomer cannot crystallize out with the trans-isomer.

The water temperature of 21.5°C. is essential to the formation of the hydrated crystals since at temperatures above this limit the hydrate will not be formed. The corresponding hydrated cis-isomer crystals do not seem to exist at any temperature.

A comparison of the water solubility curves of both the cis- and trans-isomers, as shown in FIG. 1 and expressed as weight amount of anhydrous AMCHA, seems to suggest the existence of the two types of trans-isomer crystals; that is, the excess amount of crystals remaining insoluble in the saturated solution below 21.5°C. are the hydrated crystals. Over 21.5°C., the crystals remaining insoluble are the known anhydrous crystals. The temperature of 21.5°C. is the critical transition point between the two types of crystals.

The most characteristic, or unique point of this invention, is the fact that recrystallizing for purification should be carried out at a temperature of below the transition point.

In carrying out this process, the amount of cold water used for recrystallization will vary mainly depending upon the content of cis-isomer in the crude AMCHA. Theoretically, the upper limit of the amount of water is less than the amount necessary to prepare a saturated solution of trans-AMCHA at the particular recrystallization temperature. The lower quantity limit of water is that amount which just yields a saturated solution of the cis-isomer in the crude AMCHA. When the content of cis-isomer, however, is below 10 percent (by weight), two or three times the amount of water, based on the weight of the crude AMCHA, may practically be used to optimize the time necessary to convert the hydrated trans-AMCHA hydrate to the pure crystals and to optimize the mechanical stirring operation of the slurry.

Best results are attainable when the recrystallization temperature approximates 0°C., and particularly 1° to 5°C. from the point of view of industrial performance. The recrystallization time necessary for satisfactory purification ranges from 30 minutes to several hours.

In one additional embodiment of this invention, purification can be enhanced by the addition of a small amount of alcohol (such as methanol or ethanol) in order to decrease loss of trans-AMCHA remaining in the mother liquid. Although the addition of an alcohol will decrease the solubility of both the isomers, at the same time, it will cause a lowering of the transition temperature. The addition of a large amount of alcohol, therefore, is undesirable, since it will require greater cooling of the water bath.

In another modification of the present invention, crude AMCHA may be dissolved completely in water by heating and the solution concentrated to an adequate saturated solution, then cooled below the transition temperature (21.5°C.) to crystallize pure trans-AMCHA hydrate.

The present invention will now be illustrated with more particularly by the following Examples which are presented herein for purposes of illustration only and should not be construed as limiting unless otherwise specified.

EXAMPLE 1

30 g. of crude AMCHA (cis/trans = 2.4/97.6) was portion-wise added while stirring to 65 ml. of water cooled to a temperature of between 1° and 3°C. The crystals were gradually converted to crystals of pure trans-AMCHA hydrate over a period of about 1 hour. The slurry mixture was filtered and the crystals collected and washed with a small amount of cold water. The crystals were dried at 60° to 80°C. to give 20 g. of anhyddrous pure crystals of trans-AMCHA, which contained no cis-isomer (as detefmined by the same analytical method as will be discussed in Example 2).

For comparison, crystals obtained at 25°C. from an aqueous solution (65 ml.) of the same crude AMCHA (30 g.) were similarly analyzed and found to contain 2.1 percent of cis-isomer (yield: 20 g.).

EXAMPLE 2

An aqueous solution containing 20 g. of crude AMCHA (cis/trans = 2.9/97.1) was concentrated in vacuo to 70 ml. and gradually cooled while stirring. At first, a small amount of white minute crystals of anhydrous trans-AMCHA were formed. When the temperature of the solution was lowered to below 21.5°C., crystals of trans-AMCHA hydrate were seeded out and the anhydrous crystals were converted to hydrate crystals. Stirring was continued. Soon after, colorless prisms of trans-AMCHA hydrate were formed and recrystallized out. The temperature of the solution was lowered to 0°C. and stirring was continued for 1 hour. Crystals were collected by filtration and washed with a small amount of cold water. The crystals were air-dried at a temperature of below 20°C. to give 14.9 g. of crystals of trans-AMCHA hydrate ($C_8H_{15}NO_2 \cdot 3H_2O$. Yield: 57 percent calculated from the anhydrous crude-AMCHA). Loss on drying of the pure crystals was found to be 26.3 percent against theoretical 25.6 percent. A part of the crystals was acetylated with acetic anhydride and then methylated with disazomethane to give N-acetylmethyl ester derivative, in which no derivative of cis-isomer was found by gas chromatographic analysis using 2 percent of P.G. 20 M as a stationary liquid (detective limit by the analysis is over 0.2 percent).

For comparison, anhydrous crystals of trans-AMCHA were crystallized at a temperature of above 21.5°C. from a concentrated solution (70 ml.) of the same crude AMCHA (20 g.) by addition of a small amount of methanol, and was similarly analyzed. 1.3 percent of cis-isomer was found in the purified crystals (Yield: 10.5 g.).

EXAMPLE 3

31.4 g. of AMCHA (cis/trans = 1/1) produced by reduction of 4-cyanocyclohexane carboxylic acid was dissolved in 200 ml. of 5 percent sodium hydroxide solution and isomerized at 240°C. for 3 hours in an autoclave. The reaction solution was passed through a column of strong acidic ion-exchange resin (Dialcn SKIB; 400 ml.). After washing the column with water, AMCHA on the column was eluted with 4 percent aqueous ammonium solution. The eluate was concentrated and 30 ml. of methanol was added to effect crystallization. The crystals were collected by filtration, washed with methanol and dried to give 21.5 g. of crude AMCHA (cis/trans = 3.8/96.2). The crude AMCHA was dissolved in water and concentrated to about 50 ml. in vacuo. In the same manner as in Example 2 (0°C., 1 hour), pure crystals of trans-AMCHA hydrate were obtained. No cis-isomer was found in the crystals by gas chromatographical analysis.

Having now fully described the invention, it will be apparent to those of ordinary skill in the art that many changes and modifications can be made thereto without departing from the spirit or scope of the invention.

ACCORDINGLY,

What is claimed is:

1. Crystalline trans-4-aminomethylcyclohexane carboxylic acid . $3H_2O$.

* * * * *